US012699040B2

(12) United States Patent
Hirai et al.

(10) Patent No.: US 12,699,040 B2
(45) Date of Patent: Aug. 4, 2026

(54) POSE CHANGE APPARATUS AND INSPECTION METHOD

(71) Applicant: Hitachi Astemo, Ltd., Hitachinaka (JP)

(72) Inventors: Yoshiaki Hirai, Hitachinaka (JP);
Hiroki Morii, Hitachinaka (JP);
Takamasa Imaizumi, Hitachinaka (JP);
Hiroyuki Hayashi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 81 days.

(21) Appl. No.: 18/725,417

(22) PCT Filed: Jan. 5, 2023

(86) PCT No.: PCT/JP2023/000034
§ 371 (c)(1),
(2) Date: Jun. 28, 2024

(87) PCT Pub. No.: WO2023/136187
PCT Pub. Date: Jul. 20, 2023

(65) Prior Publication Data
US 2025/0155359 A1     May 15, 2025

(30) Foreign Application Priority Data

Jan. 11, 2022     (JP) ................................ 2022-002043

(51) Int. Cl.
*G01N 21/01*          (2006.01)
(52) U.S. Cl.
CPC ..... *G01N 21/01* (2013.01); *G01N 2021/0112* (2013.01); *G01N 2201/025* (2013.01)
(58) Field of Classification Search
CPC ........... G01N 21/01; G01N 2021/0112; G01N 2201/025; G01N 21/8851; G01N 2021/8825; G01N 21/8806; G01N 21/952
See application file for complete search history.

(56) References Cited

U.S. PATENT DOCUMENTS

2016/0040976 A1*   2/2016   Berkeley ................ A61B 3/102
                                                    356/479
2017/0292916 A1*   10/2017   Yang .................. G01N 21/8806
                          (Continued)

FOREIGN PATENT DOCUMENTS

JP          5-64760          8/1993
JP          7-55711          3/1995
                     (Continued)

OTHER PUBLICATIONS

JP_H0755711_A_I, with paragraph numbers (Year: 1995).*
                          (Continued)

*Primary Examiner* — Tarifur R Chowdhury
*Assistant Examiner* — Carlos Perez-Guzman
(74) *Attorney, Agent, or Firm* — Wenderoth, Lind & Ponack, L.L.P.

(57)          ABSTRACT

A pose change apparatus includes a first output shaft rotatable around a first rotational axis, a first member rotatable around the first output shaft according to a rotation of the first output shaft, a second output shaft disposed on the first member and rotatable around a second rotational axis tilted at an angle with respect to the first rotational axis, a second member disposed on the first member, configured to hold an inspection target, and rotatable around the second rotational axis according to a rotation of the second output shaft, a first actuator configured to rotate the first output shaft forwardly and reversely within a first angular range, and a second actuator configured to rotate the second output shaft forwardly and reversely within a second angular range.

18 Claims, 16 Drawing Sheets

(56)          References Cited

U.S. PATENT DOCUMENTS

2021/0354126 A1 * 11/2021 Beckett .................. G01N 21/01
2023/0062347 A1 * 3/2023 Nguyen ............. G01N 21/8806

FOREIGN PATENT DOCUMENTS

| | | | |
|---|---|---|---|
| JP | 2000-114332 | | 4/2000 |
| JP | 2007317965 A | * | 12/2007 |
| JP | 2009-174943 | | 8/2009 |
| JP | 2016-65782 | | 4/2016 |
| WO | 2021/187002 | | 9/2021 |

OTHER PUBLICATIONS

JP2007317965A, translation with paragraph numbers (Year: 2007).*
JP2000114332A_ translation with paragraph numbers (Year: 2000).*
International Search Report issued Feb. 14, 2023 in International
Application No. PCT/JP2023/000034, with English translation.
Written Opinion of the International Searching Authority issued
Feb. 14, 2023 in International Application No. PCT/JP2023/
000034, with English translation.

* cited by examiner

FIG. 3

| TEACHING POINT | ROTATIONAL ANGLE OF TCP ROTATIONAL AXIS | $\theta 1$ | $\theta 2$ |
|---|---|---|---|
| 1 | 0 | 0 | 0 |
| 2 | 0 | 0 | 20 |
| 3 | 15 | 5.152 | 19.312 |
| 4 | 30 | 9.962 | 17.298 |
| 5 | 45 | 14.106 | 13.999 |
| 6 | 60 | 17.298 | 9.849 |
| 7 | 75 | 19.312 | 5.079 |
| 8 | 90 | 20 | 0 |
| 9 | 105 | 19.312 | −5.079 |
| 10 | 120 | 17.298 | −9.849 |
| 11 | 135 | 14.106 | −13.999 |
| 12 | 150 | 9.962 | −17.298 |
| 13 | 165 | 5.152 | −19.312 |
| 14 | 180 | 0 | −20 |
| 15 | 195 | −5.152 | −19.312 |
| 16 | 210 | −9.962 | −17.298 |
| 17 | 225 | −14.106 | −13.999 |
| 18 | 240 | −17.298 | −9.849 |
| 19 | 255 | −19.312 | −5.079 |
| 20 | 270 | −20 | 0 |
| 21 | 285 | −19.312 | 5.079 |
| 22 | 300 | −17.298 | 9.849 |
| 23 | 315 | −14.106 | 13.999 |
| 24 | 330 | −9.962 | 17.298 |
| 25 | 345 | −5.152 | 19.312 |

(b)

(a)

(b)

(a)

(b)

(a)

POSE CHANGE APPARATUS AND INSPECTION METHOD

CROSS-REFERENCE TO RELATED APPLICATION

The present application claims priority under the Paris Convention to Japanese Patent Application No. 2022-002043 filed on Jan. 11, 2022. The entire disclosure of Japanese Patent Application No. 2022-002043 including the specification, the claims, the drawings, and the abstract is incorporated herein by reference in its entirety.

TECHNICAL FIELD

The present invention relates to a pose change apparatus and an inspection method.

BACKGROUND ART

Japanese Patent Application No. 2016-65782 discloses an inspection apparatus that inspects an outer peripheral surface of an inspection target including a cylindrical or a columnar main body portion.

This inspection apparatus rotates the inspection target around an axis, images a bright field region, a dark field region, and a border region between the bright field region and the dark field region, and detects a defective portion on the outer peripheral surface of the inspection target based on the captured image.

CITATION LIST

Patent Literature

PTL 1: Japanese Patent Application Laid-Open No. 2016-65782

SUMMARY OF INVENTION

Technical Problem

The inspection apparatus disclosed in Japanese Patent Application No. 2016-65782 rotates the inspection target around the axis, but is not designed to conically rotate the inspection target at an angle with respect to the axis to detect a defect such as a scratch on the surface like, for example, an inspection of a crown surface of a piston.

Further, using an articulated robot or the like to hold the inspection target may lead to a cost increase.

One of objects of the present invention is to provide a pose change apparatus and an inspection method capable of conically rotating an inspection target while curbing a cost increase.

Solution to Problem

According to one aspect of the present invention, a pose change apparatus includes a first output shaft rotatable around a first rotational axis, a first member rotatable around the first output shaft according to the rotation of the first output shaft, a second output shaft disposed on the first member and rotatable around a second rotational axis tilted at an angle with respect to the first rotational axis, a second member disposed on the first member, configured to hold the inspection target, and rotatable around the second rotational axis according to the rotation of the second output shaft, a first actuator configured to rotate the first output shaft forwardly and reversely within a predetermined angular range, and a second actuator configured to rotate the second output shaft forwardly and reversely within a predetermined angular range.

According to the one aspect of the present invention, the inspection target can be conically rotated with a curbed cost increase.

BRIEF DESCRIPTION OF DRAWINGS

FIG. 3 is an operation table illustrating the operation of the pose change apparatus according to the first embodiment.

DESCRIPTION OF EMBODIMENTS

First Embodiment

Figure 1:
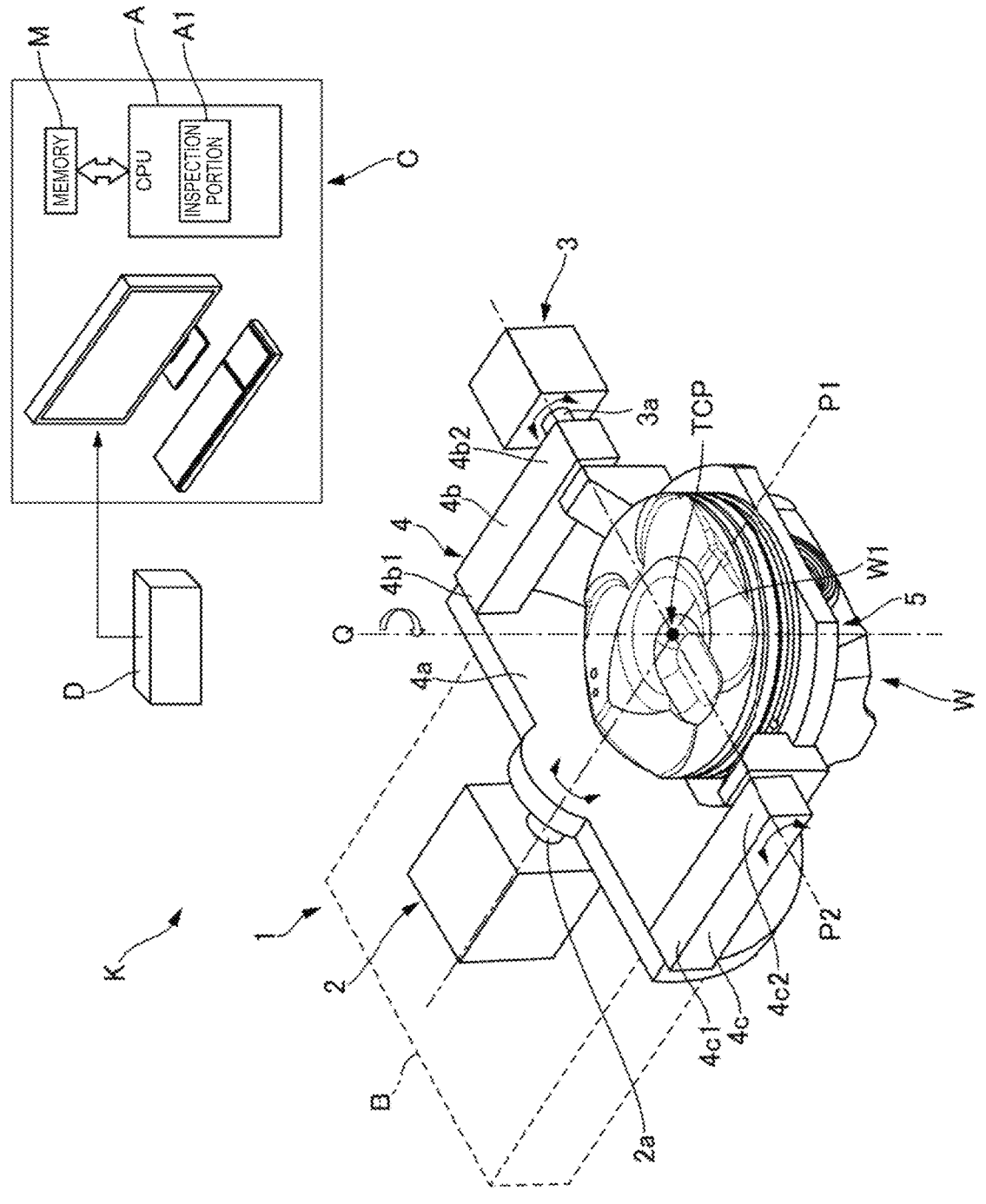
FIG. 1 is an overall view of an inspection apparatus including a pose change apparatus according to a first embodiment.

FIG. 1 is an overall view of an inspection apparatus including a pose change apparatus according to a first embodiment.
(Configuration of Inspection Apparatus)

An inspection apparatus K includes a camera D, a pose change apparatus 1, and a computer C.

The camera D captures an image of an inspection surface of a piston (an inspection target) W.

The pose change apparatus 1 changes the pose of the piston W relative to the camera D.

The computer C is, for example, a personal computer, and includes a memory M and a CPU A.

The memory M stores therein a learning result of machine learning conducted using a plurality of sample images.

The machine learning is, for example, learning using a neural network, and learning based on deep learning is employed in the first embodiment.

Further, the inspection apparatus K conducts learning based on deep learning in which a neural network is connected in a multi-layered manner, thereby being able to increase determination accuracy of the inspection carried out by an inspection portion A2 compared with when a neural network is employed.

The CPU A includes an inspection portion A1. The inspection portion A1 inspects whether a scratch or a defect is present on a crown surface W1 of the piston W based on the captured image acquired by the camera D and the learning result acquired from the deep learning stored in the memory M, cuts out a defect candidate portion, and outputs a defect candidate image as an inspection result.
(Configuration of Pose Change Apparatus)

The pose change apparatus 1 includes a first motor (a first actuator) 2, a first member 4, a second member 5, and a second motor (a second actuator) 3. The first motor 2 includes a first motor output shaft (a first output shaft) 2a fixed to a base B and rotatable around a first rotational axis P1. The first member 4 includes a base portion 4a, and a first arm 4b and a second arm 4c extending in a direction along the first rotational axis P1 in a forked manner with one ends 4b1 and 4cl thereof fixed to the base portion 4a while spaced apart from each other. The second member 5 is rotatably supported by an opposite end 4b2 of the first arm 4b and an opposite end 4c2 of the second arm 4c of the first member 4, and fixedly holds the piston (the inspection target) W. The second motor 3 includes a second motor output shaft (a second output shaft) 3a fixed to the opposite end 4b2 of the first arm 4b of the first member 4 and rotatable around a second rotational axis P2 approximately perpendicular to and intersecting with the first rotational axis P1.

The first rotational axis P1 and the second rotational axis P2 being approximately perpendicular means that they are perpendicular with an error of about +10°.

Due to that, the pose change apparatus 1 can achieve a conical motion of the piston W with a simple configuration capable of curbing a cost increase.

Further, the pose change apparatus 1 is configured in such a manner that the first member 4 includes the base portion 4a, and the first arm 4b and the second arm 4c extending in the direction along the first rotational axis P1 with the one ends 4b1 and 4cl thereof fixed to the base portion 4a while spaced apart from each other, and the second member 5 is rotatably supported by the opposite end 4b2 of the first arm 4b and the opposite end 4c2 of the second arm 4c, thereby allowing the first output shaft 2a of the first motor 2 and the second output shaft 3a of the second motor 3 to have the first rotational axis P1 and the second rotational axis P2 that not coincide with each other, thus further simply allowing the piston W to perform the conical motion.

The pose change apparatus 1 is configured in such a manner that the first rotational axis P1 of the first output shaft 2a of the first motor 2 and the second rotational axis P2 of the second output shaft 3a of the second motor 3 extend approximately perpendicularly to each other, thereby making it easy to define a piston conical motion center TCP and thus allowing the piston W to reliably perform the conical motion.

Further, the pose change apparatus 1 is configured in such a manner that the first rotational axis P1 of the first output shaft 2a of the first motor 2 and the second rotational axis P2 of the second output shaft 3a of the second motor 3 intersect with each other, thereby allowing the piston W to further correctly perform the conical motion.

Further, the pose change apparatus 1 is configured to cause the piston W to perform the conical motion centered at the piston conical motion center TCP on the crown surface W1 of the piston W at which the first rotational axis P1 of the first output shaft 2a of the first motor 2 and the second rotational axis P2 of the second output shaft 3a of the second motor 3 intersect with each other, thereby allowing the image of the crown surface W1 of the piston W for the inspection to be captured by the camera D with improved accuracy.

Further, the pose change apparatus 1 is configured to include the first motor 2 fixed to the base B, which rotates the first member 4, and the second motor 3 fixed to the first arm 4b of the first member 4, which rotates the second member 5, thereby allowing the rotational angles of the first motor 2 and the second motor 3 to be easily controlled.

Further, the second motor 3, which rotates the second member 5 and the piston W, is subjected to a lighter drive load compared with the first motor 2, which rotates the first member 4, the second member 5, the piston W, and the second motor 3, thereby being able to be embodied using a small-sized motor that provides a lower maximum output than the first motor 2 and thus contribute to a reduction in the size of the pose change apparatus 1 and improve the controllability of the second motor 3.

The first motor output shaft 2a is fixed to the base portion 4a of the first member 4, and rotates the first member 4 around the first rotational axis P1.

The second motor output shaft 3a is fixed to the second member 5, and rotates the second member 5 around the second rotational axis P2.

Changing a rotational angle θ1 of the first motor output shaft 2a and a rotational angle θ2 of the second motor output shaft 3a synchronously causes the tilt angles of the piston W to be combined, thereby allowing the piston W to perform the conical motion around a TCP rotational axis Q about the piston conical motion center TCP, which is an intersection point on the crown surface W1 of the piston W between the first rotational axis P1 and the second rotational axis P2. The details thereof will be described below.

(Operation of Pose Change Apparatus)

Figure 2:
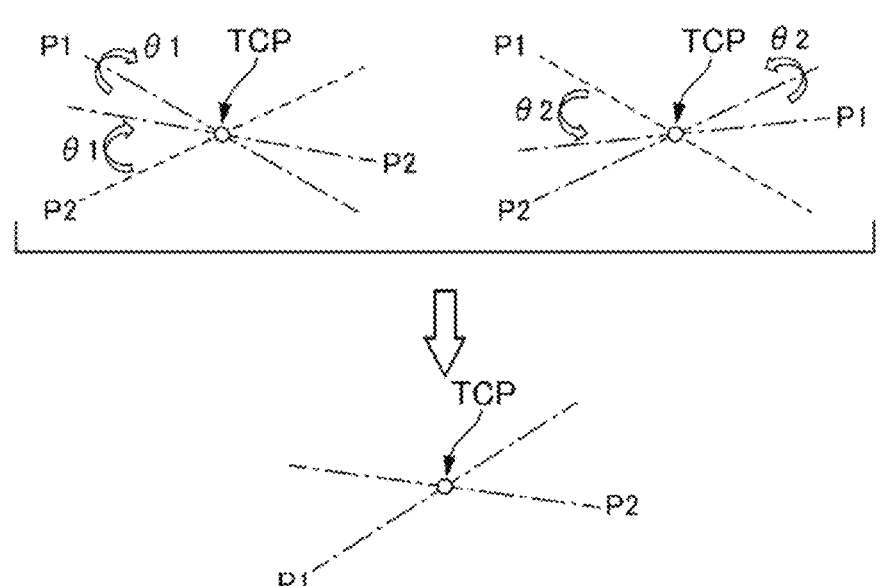
FIG. 2 is a schematic view illustrating an operation of the pose change apparatus according to the first embodiment.

FIG. 2 is a schematic view illustrating the operation of the pose change apparatus according to the first embodiment. FIG. 3 is an operation table illustrating the operation of the pose change apparatus according to the first embodiment.

The upper left side of FIG. 2 illustrates an operation position of the second rotational axis P2 with the first output shaft 2a of the first motor 2 rotated around the first rotational axis P1 by the rotational angle θ1. The upper right side of FIG. 2 illustrates an operation position of the first rotational axis P1 with the second output shaft 3a of the second motor 3 rotated around the second rotational axis P2 by the rotational angle θ2. The lower side of FIG. 2 illustrates operation positions of the first rotational axis P1 and the second rotational axis P2 when these two synchronous changes are combined.

As indicated in the operation table of FIG. 3, the tilt angles of the piston W are combined to allow the piston W to perform the conical motion around the TCP rotational axis Q about the piston conical motion center TCP by 360° by synchronously changing the rotational angle θ1 of the first motor output shaft 2a of the first motor 2 around the first rotational axis P1 and the rotational angle θ2 of the second motor output shaft 3a of the second motor 3 around the second rotational axis P2 at 25 teaching points.

The image of the inspection surface of the piston (the inspection target) W is captured by the camera D at each of the teaching points.

Figure 4:
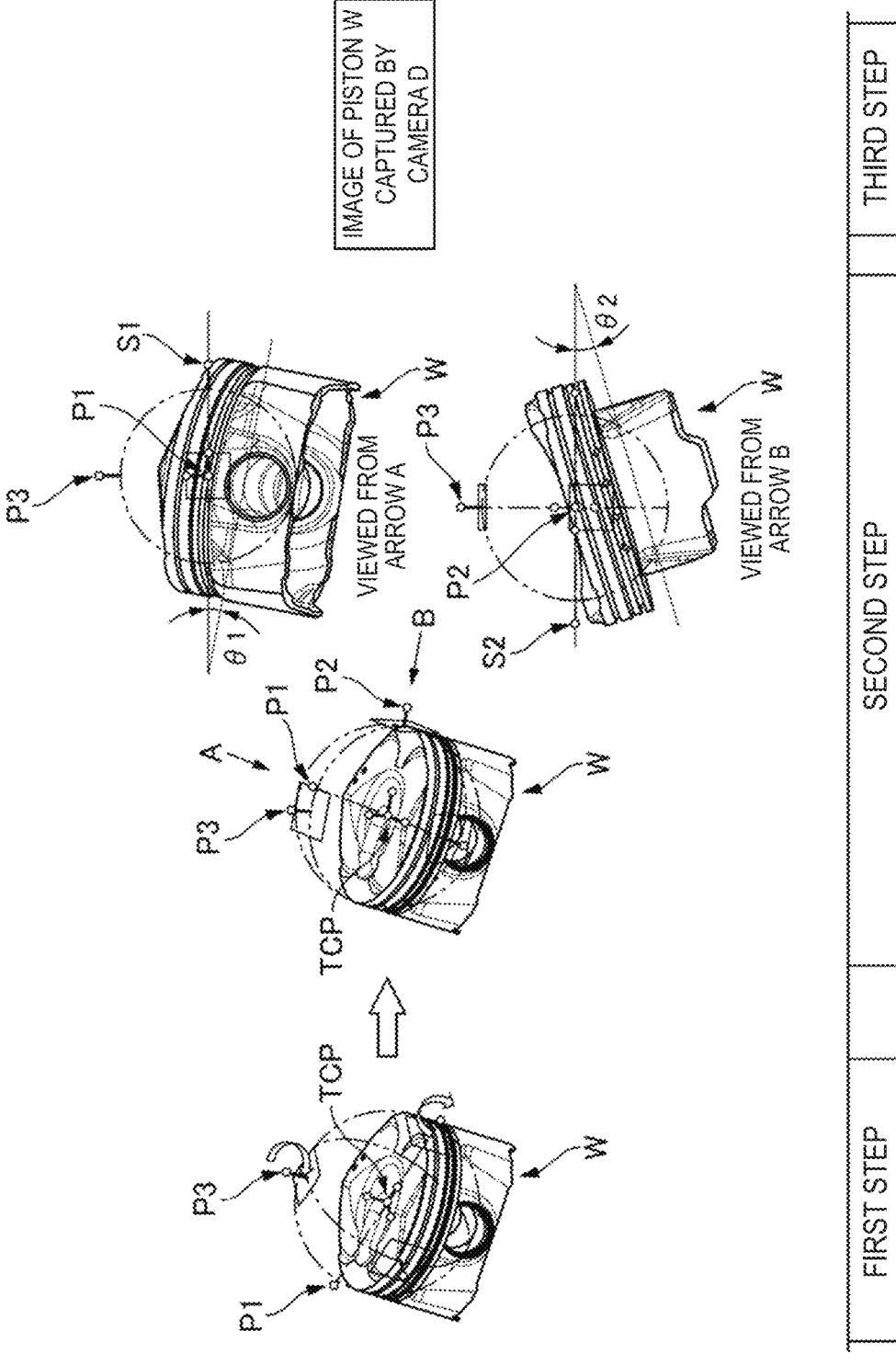
FIG. 4 is a timing chart illustrating a flow of an operation of setting motor rotational angles of the pose change apparatus according to the first embodiment.

FIG. 4 is a timing chart illustrating a flow of the operation of setting the motor rotational angles of the pose change apparatus according to the first embodiment.

In a first step, for example, the piston W is placed and fixedly held on the second member 5 positioned at a teaching point 4 indicated in FIG. 3, and the pose of the piston W is identified in a coordinate system of the piston W.

In a second step, the pose of the piston W in the coordinate system of the piston W that is acquired in the first step is converted into a coordinate system of a two-axis conical motion control mechanism based on the first rotational axis P1 and the second rotational axis P2, i.e., a coordinate system of the pose change apparatus 1, and a tilt angle θ1° of the piston W with respect to a reference surface S1 of the first motor 2 and a tilt angle θ2° of the piston W with respect to a reference surface S2 of the second motor 3 are measured in terms of this coordinate system of the pose change apparatus 1.

The tilt angle θ2° of the piston W is measured at a position after a tilt angle correction of −θ1°.

Based on that, a control angle of the first output shaft 2a of the first motor 2 is set to θ1°, and a control angle of the second output shaft 3a of the second motor 3 is set to θ2°.

Each of these steps is repeated for each of the 25 teaching points, and the control angle θ1° of the first output shaft 2a of the first motor 2 and the control angle θ2° of the second output shaft 3a of the second motor 3 are measured and determined at each of the teaching points.

In a third step, the pose control apparatus 1 is actuated according to the control angle θ1° of the first output shaft 2a of the first motor 2 and the control angle θ2° of the second output shaft 3a of the second motor 3 at the 25 teaching points, and the crown surface W1 of the piston W is imaged by the camera D.

FIG. 5(a) is a first side view illustrating the operation of the pose change apparatus according to the first embodiment. FIG. 5(b) is a first plan view illustrating the operation of the pose change apparatus according to the first embodiment. FIG. 6(a) is a second side view illustrating the operation of the pose change apparatus according to the first embodiment. FIG. 6(b) is a second plan view illustrating the operation of the pose change apparatus according to the first embodiment. FIG. 7(a) is a third side view illustrating the operation of the pose change apparatus according to the first embodiment. FIG. 7(b) is a third plan view illustrating the operation of the pose change apparatus according to the first embodiment. FIG. 8(a) is a fourth side view illustrating the operation of the pose change apparatus according to the first embodiment. FIG. 8(b) is a fourth plan view illustrating the operation of the pose change apparatus according to the first embodiment.

Figure 5:
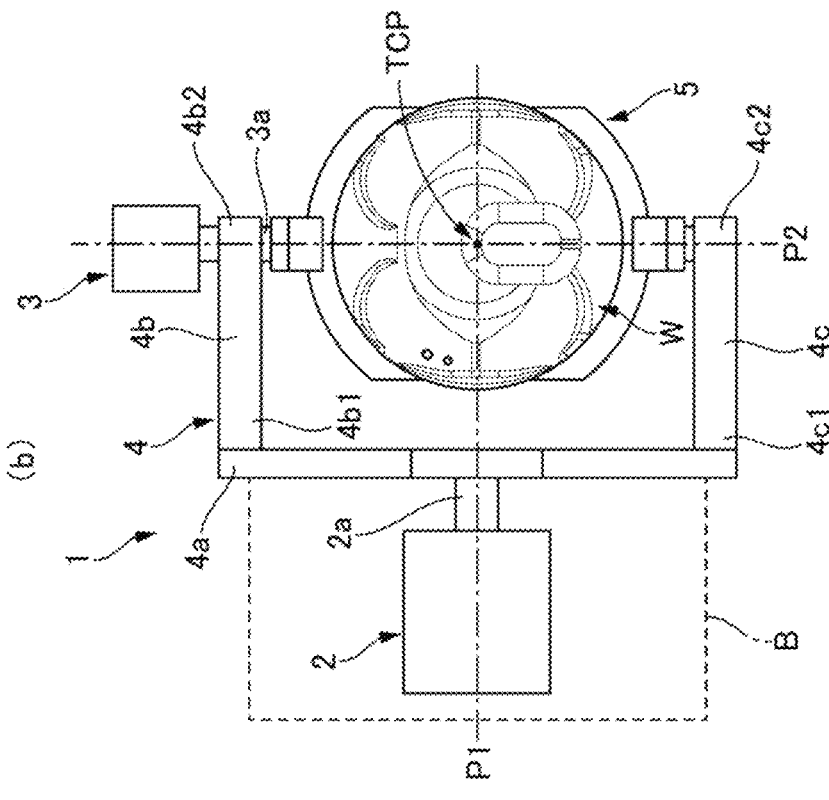
FIG. 5(a) is a first side view illustrating the operation of the pose change apparatus according to the first embodiment.
FIG. 5(b) is a first plan view illustrating the operation of the pose change apparatus according to the first embodiment.
Figure 5:
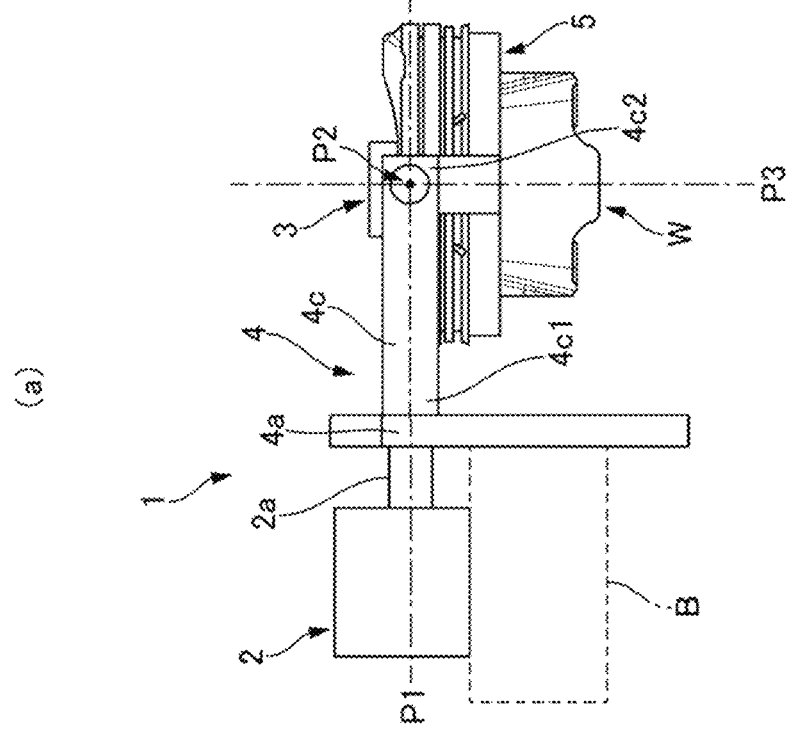
Figure 6:
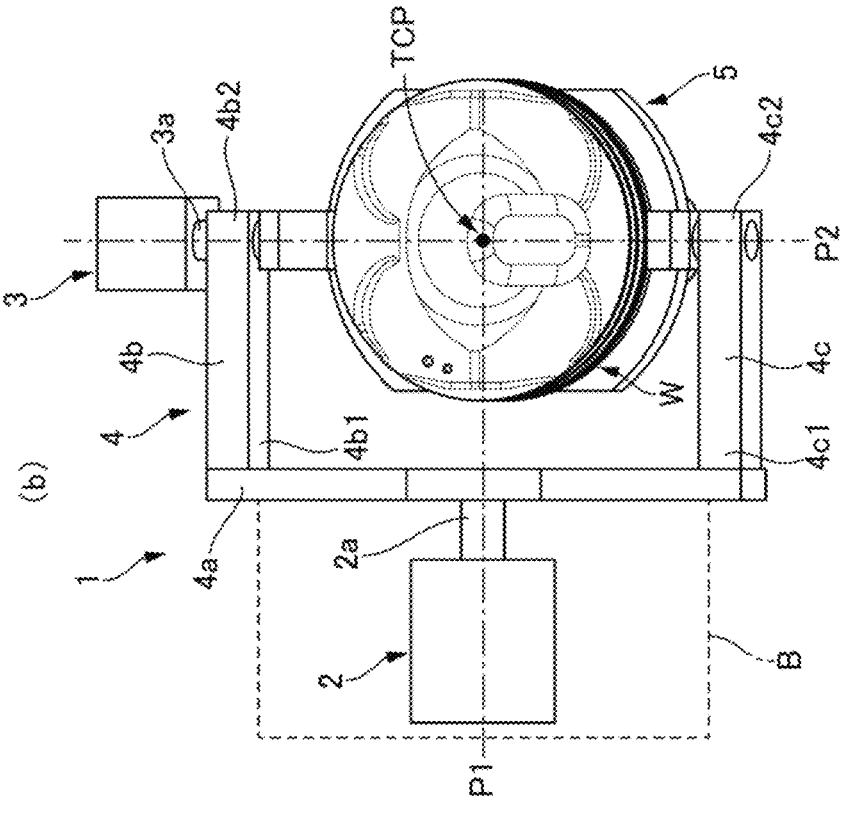
FIG. 6(a) is a second side view illustrating the operation of the pose change apparatus according to the first embodiment.
FIG. 6(b) is a second plan view illustrating the operation of the pose change apparatus according to the first embodiment.
Figure 6:
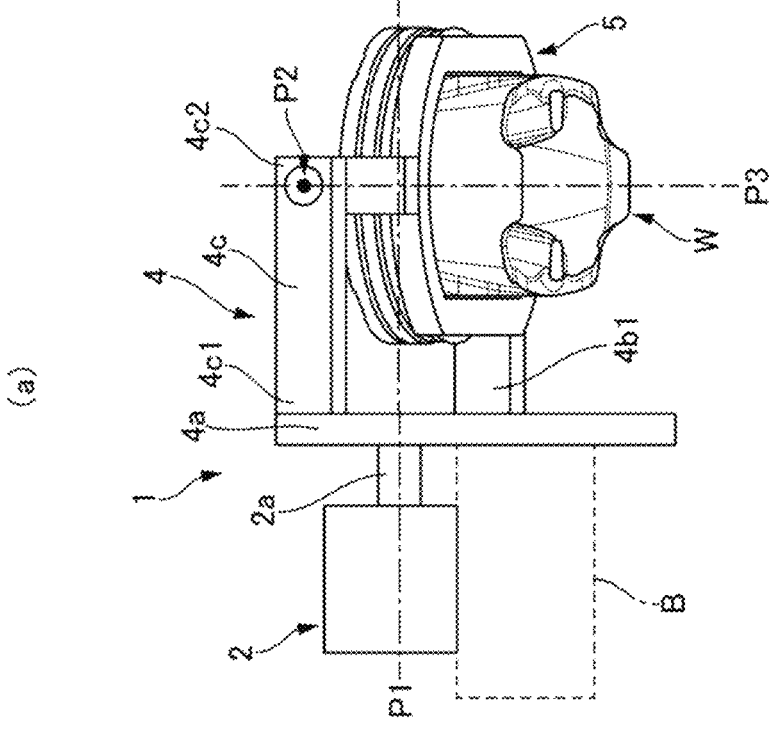
Figure 7:
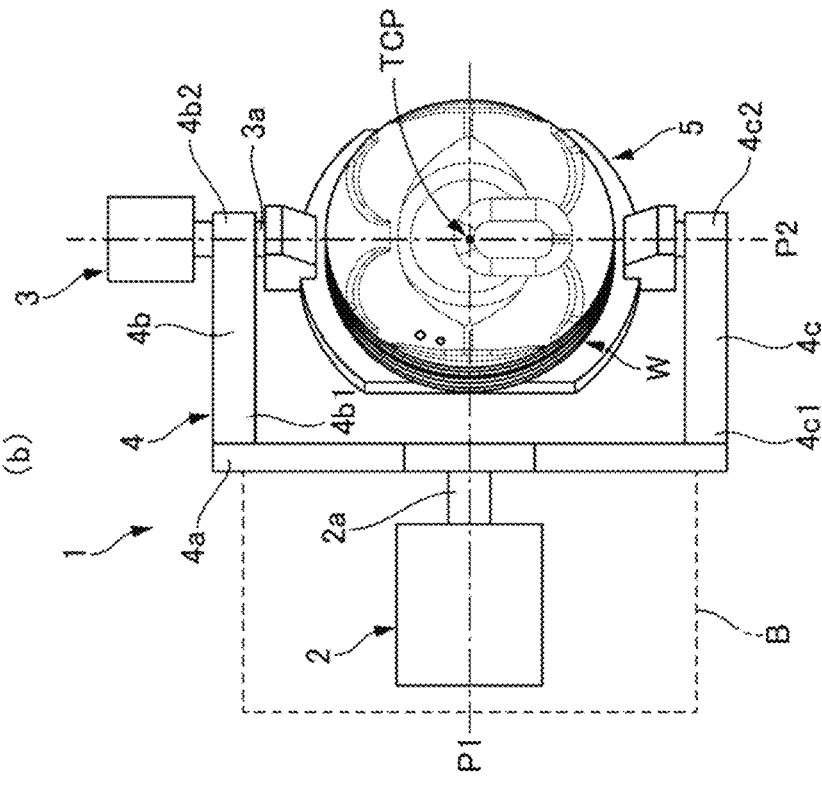
FIG. 7(a) is a third side view illustrating the operation of the pose change apparatus according to the first embodiment.
FIG. 7(b) is a third plan view illustrating the operation of the pose change apparatus according to the first embodiment.
Figure 7:
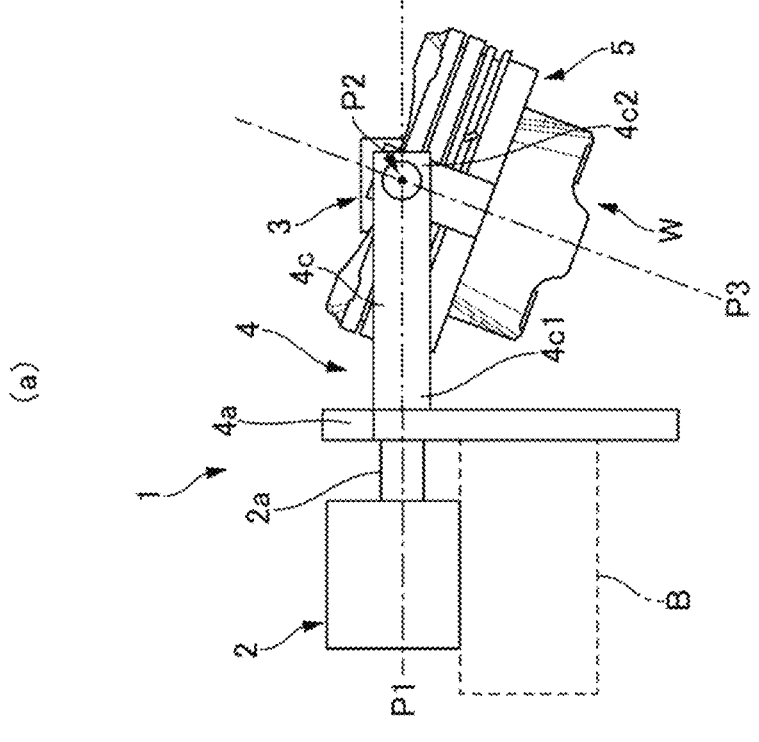
Figure 8:
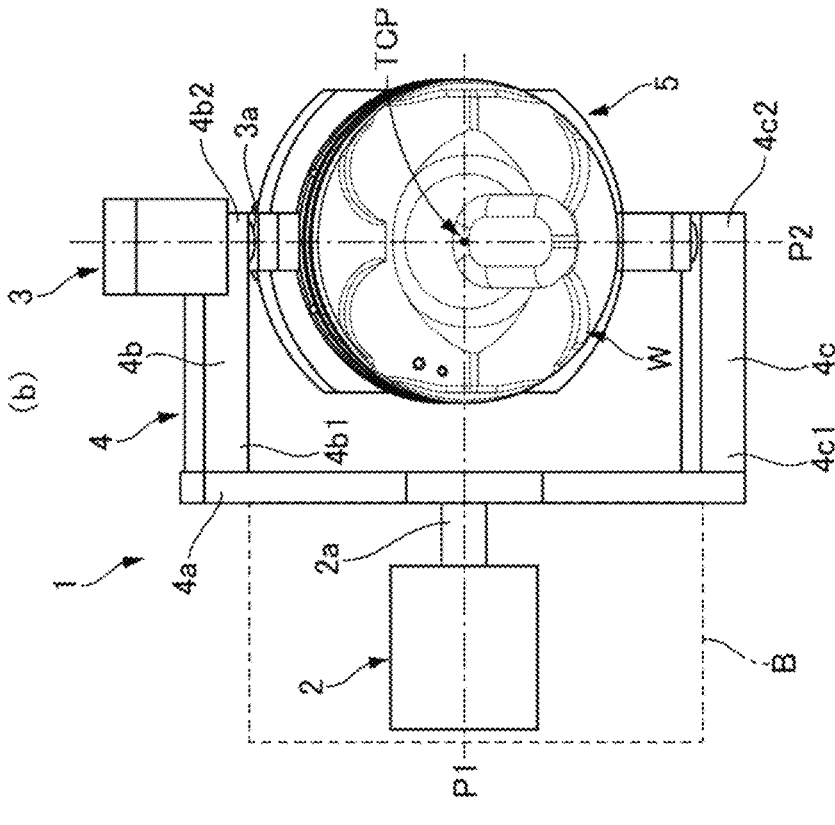
FIG. 8(a) is a fourth side view illustrating the operation of the pose change apparatus according to the first embodiment.
FIG. 8(b) is a fourth plan view illustrating the operation of the pose change apparatus according to the first embodiment.
Figure 8:
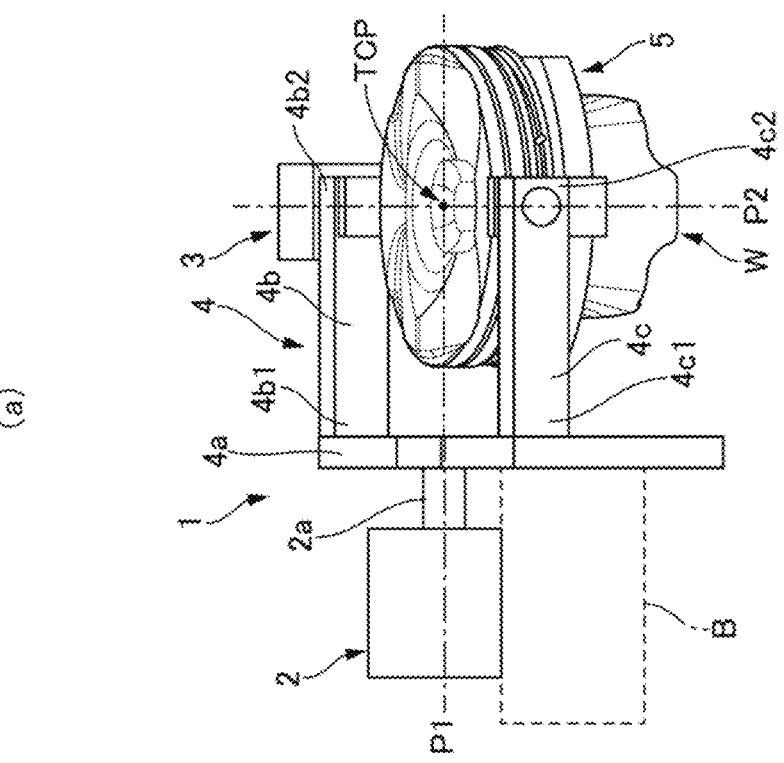

In other words, FIG. 5 illustrate the operation position of the pose change apparatus 1 at the teaching point 1. FIG. 6 illustrate the operation position of the pose change apparatus 1 at the teaching point 8. FIG. 7 illustrate the operation position of the pose change apparatus 1 at the teaching point 14. FIG. 8 illustrate the operation position of the pose change apparatus 1 at the teaching point 20.

This results in the piston W performing the conical motion around the TCP rotational axis Q about the piston conical motion center TCP.

Next, functions and advantageous effects of the first embodiment will be described.

(1) The pose change apparatus 1 is configured to include the first motor 2, the first member 4, the second member 5, and the second motor 3. The first motor 2 includes the first motor output shaft 2a fixed to the base B and rotatable around the first rotational axis P1. The first member 4 includes the base portion 4a, and the first arm 4b and the second arm 4c extending in the direction along the first rotational axis P1 in a forked manner with the one ends 4b1 and 4cl thereof fixed to the base portion 4a while spaced apart from each other. The second member 5 is rotatably supported by the opposite end 4b2 of the first arm 4b and the opposite end 4c2 of the second arm 4c of the first member 4, and fixedly holds the piston W. The second motor 3 includes the second motor output shaft 3a fixed to the opposite end 4b2 of the first arm 4b of the first member 4 and rotatable around the second rotational axis P2 perpendicular to the first rotational axis P1.

Therefore, the conical motion of the piston W can be achieved with a simple configuration capable of curbing a cost increase.

(2) The pose change apparatus 1 is configured in such a manner that the first member 4 includes the base portion 4a, and the first arm 4b and the second arm 4c extending in the direction along the first rotational axis P1 in a forked manner with the one ends 4b1 and 4cl thereof fixed to the base portion 4a while spaced apart from each other, and the second member 5 is rotatably supported by the opposite end 4b2 of the first arm 4b and the opposite end 4c2 of the second arm 4c of the first member 4.

Therefore, the pose change apparatus 1 allows the first output shaft 2a of the first motor 2 and the second output shaft 3a of the second motor 3 to have the first rotational axis P1 and the second rotational axis P2 that not coincide with each other, thus further simply allowing the piston W to perform the conical motion.

(3) The pose change apparatus 1 is configured in such a manner that the rotational axis P1 of the first output shaft 2a of the first motor 2 and the rotational axis P2 of the second output shaft 3*a* of the second motor 3 extend approximately perpendicularly to each other.

This makes it easy to define the piston conical motion center TCP, and allows the piston W to reliably perform the conical motion.

(4) The pose change apparatus 1 is configured in such a manner that the rotational axis P1 of the first output shaft 2*a* of the first motor 2 and the rotational axis P2 of the second output shaft 3*a* of the second motor 3 intersect with each other.

Therefore, the piston W can further correctly perform conical motion.

(5) The pose change apparatus 1 is configured to cause the piston W to perform the conical motion centered at the piston conical motion center TCP on the crown surface W1 of the piston W at which the rotational axis P1 of the first output shaft 2*a* of the first motor 2 and the rotational axis P2 of the second output shaft 3*a* of the second motor 3 intersect with each other.

Therefore, the image of the crown surface W1 of the piston W for the inspection can be captured by the camera D with improved accuracy.

(6) The pose change apparatus 1 is configured to include the first motor 2 fixed to the base B, which rotates the first member 4, and the second motor 3 fixed to the first arm 4*b* that is one of the first arms of the first member 4, which rotates the second member 5.

Therefore, the rotational angles of the first motor 2 and the second motor 3 can be easily controlled.

(7) The pose change apparatus 1 is configured in such a manner that the first motor 2 rotates the first member 4, the second member 5, the piston W, and the second motor 3, and the second motor 3 rotates the second member 5 and the piston W.

Therefore, the second motor 3 can be a small-sized motor that provides a low maximum output, thereby contributing to a reduction in the size of the pose change apparatus 1 and improving the controllability of the second motor 3.

Figure 9:
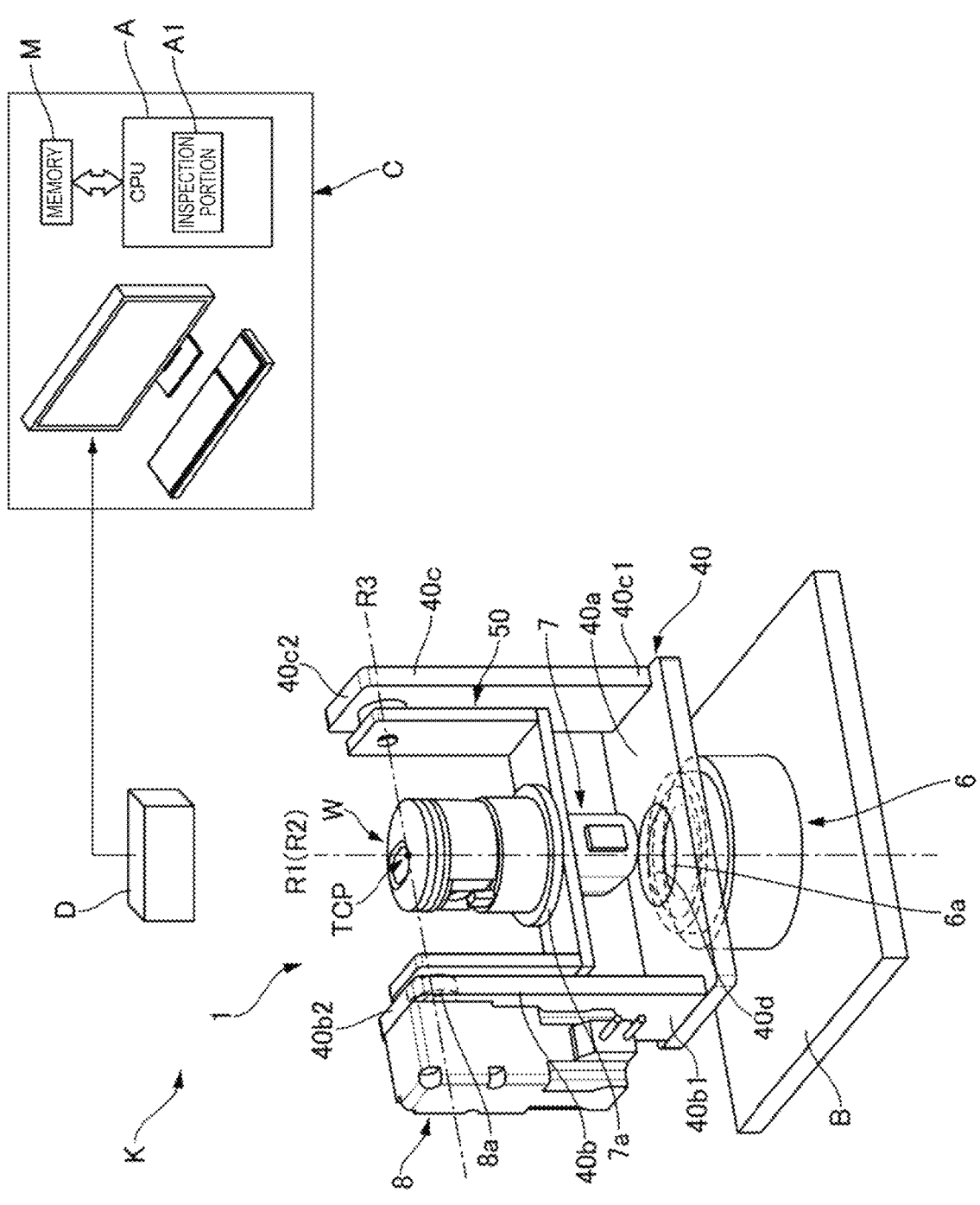
FIG. 9 is an overall view of an inspection apparatus including a pose change apparatus according to a second embodiment.

FIG. 9 is an overall view of an inspection apparatus including a pose change apparatus according to a second embodiment.

The first embodiment is configured to cause the piston W to perform the conical motion using the first motor 2 and the second motor 3, but the second embodiment is configured to cause the piston W to perform the conical motion using the first motor 2, the second motor 3, and a third motor 6.

(Configuration of Pose Change Apparatus)

The pose change apparatus 1 is configured to include a first motor (the first actuator) 6, a first member 40, a second member 50, a second motor (the second actuator) 7, and a third motor (an angle holding mechanism) 8. The first motor 6 includes a first motor output shaft (the first output shaft) 6*a* fixed to the base B and rotatable around a first rotational axis R1. The first member 40 includes a base portion 40*a*, and a first arm 40*b* and a second arm 40*c* extending in a direction along the first rotational axis R1 in a forked manner with one ends 40*b*1 and 40*c*1 thereof fixed to the base portion 4*a* while spaced apart from each other. The second member 50 is swingably supported by an opposite end 40*b*2 of the first arm 40*b* and an opposite end 40*c*2 of the second arm 40*c*, and fixedly holds the piston W with both the radial sides thereof opened. The second motor 7 includes a second motor output shaft (the second output shaft) 7*a* fixed to the second member 50 and rotatable around a second rotational axis R2 tiltable at an angle with respect to the first rotational axis R1. The third motor 8 includes a third motor output shaft 8*a* fixed to the opposite end 40*b*2 of the first arm 40*b* of the first member 40 and rotatable around a third rotational axis R3 approximately perpendicular to and intersecting with the first rotational axis P1.

The second member 50 is disposed between the first arm 40*b* and the second arm 40*c* extending in the direction along the first rotational axis R1 in a forked manner in this manner, and therefore an increase in the size of the pose change apparatus 1 can be prevented.

Further, since both the radial sides of the second member 50 are opened, the piston W can be easily set up and extracted.

The first motor output shaft 6*a* fixed to the base portion 40*a* of the first member 40 rotates the first member 40 around the first rotational axis R1.

The second motor output shaft 7*a* fixed to the second member 50 rotates the piston W around the second rotational axis R2.

The third motor output shaft 8*a* fixed to the opposite end 40*b*2 of the first arm 40*b* of the first member 40 can change the tilt angle of the second rotational axis R2 with respect to the first rotational axis R1, and cause the second member 50 to swing around the third rotational axis R3 to change the tilt angle of the second member 50 with respect to the first member 40, i.e., the tilt angle of the second rotational axis R2 with respect to the first rotational axis R1 to a predetermined angle and hold it there.

Due to that, the pose change apparatus 1 can maintain an arbitrary required predetermined swing angle and achieve a further correct conical motion, and, along therewith, also allow the piston W to be easily replaced by returning the second member 50 to the position where it overlaps the first member 40.

Further, a power supply harness 7*b* of the second motor 7 is inserted through a through-hole 40*d* formed on the base portion 40*a* of the first member 40 and the first motor output shaft 6*a*.

This makes the power supply harness 7*b* less obstructive even when the second motor output shaft 7*a* of the second motor 7 is rotated.

(Operation of Pose Change Apparatus)

Figure 10:
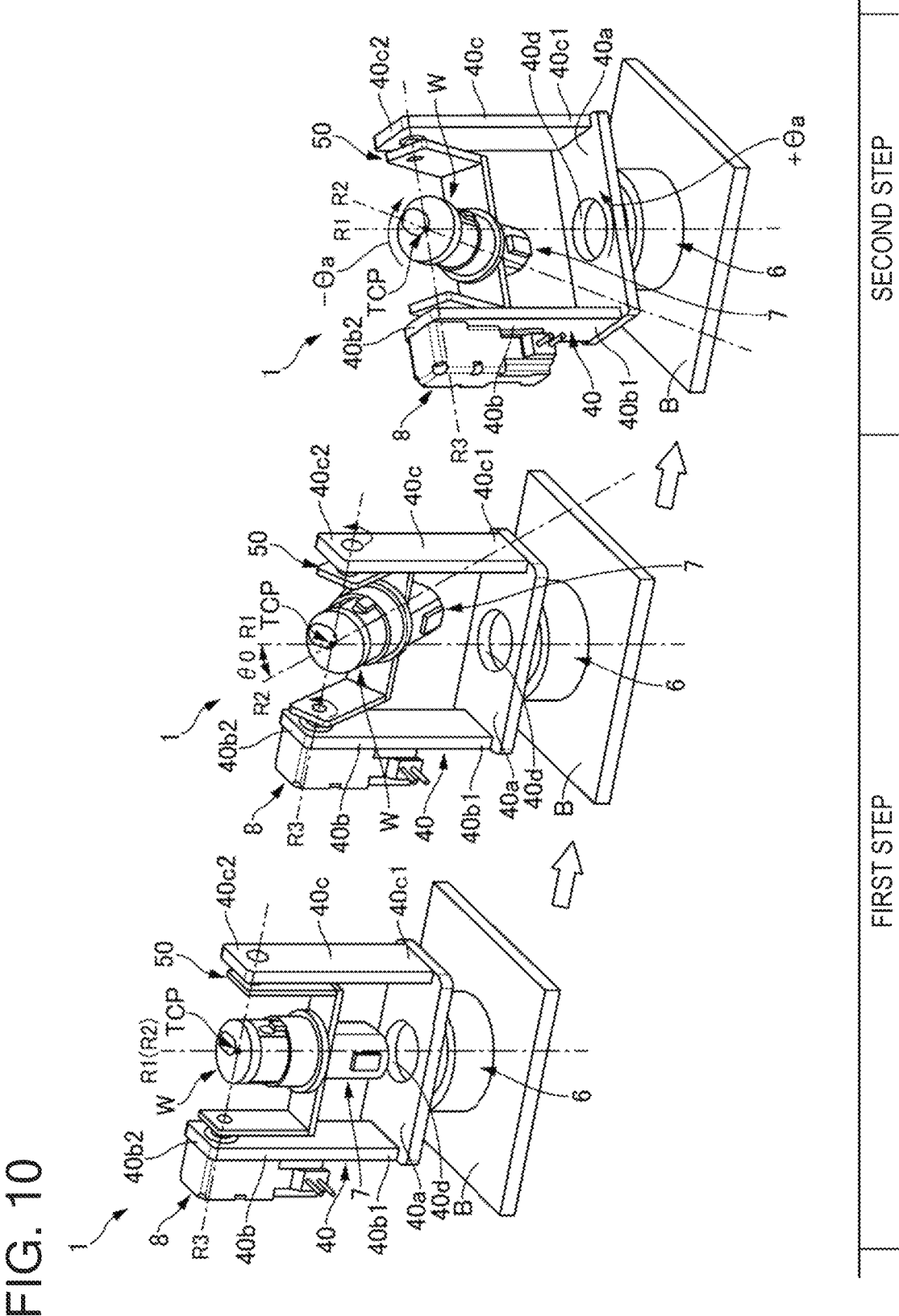
FIG. 10 is a timing chart illustrating a flow of an operation of the pose change apparatus according to the second embodiment.
Figure 11:
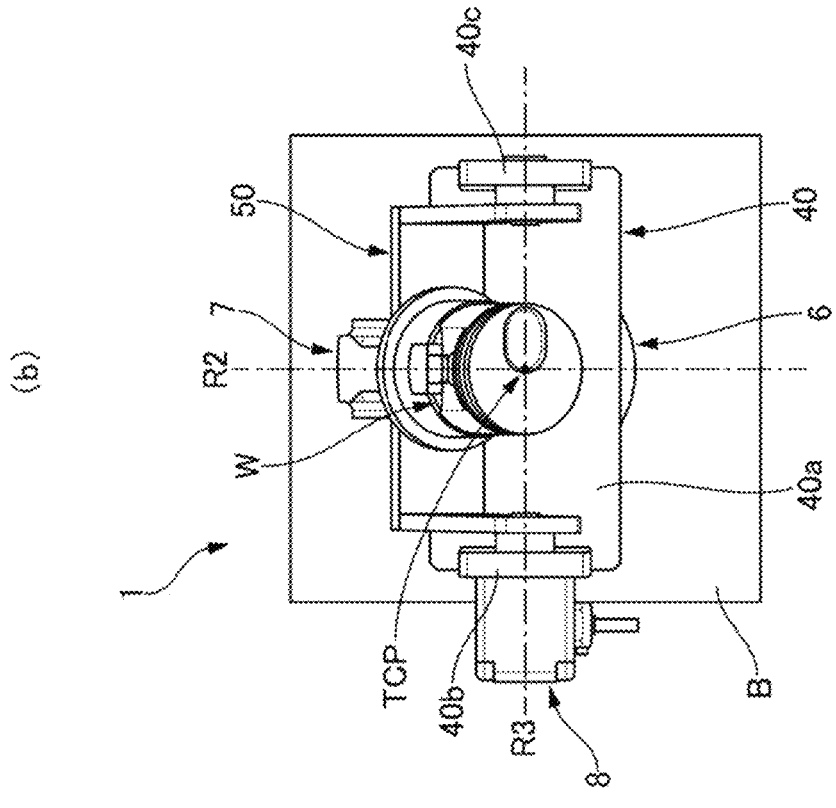
FIG. 11(a) is a first perspective view illustrating the operation of the pose change apparatus according to the second embodiment.
FIG. 11(b) is a first plan view illustrating the operation of the pose change apparatus according to the second embodiment.
Figure 11:
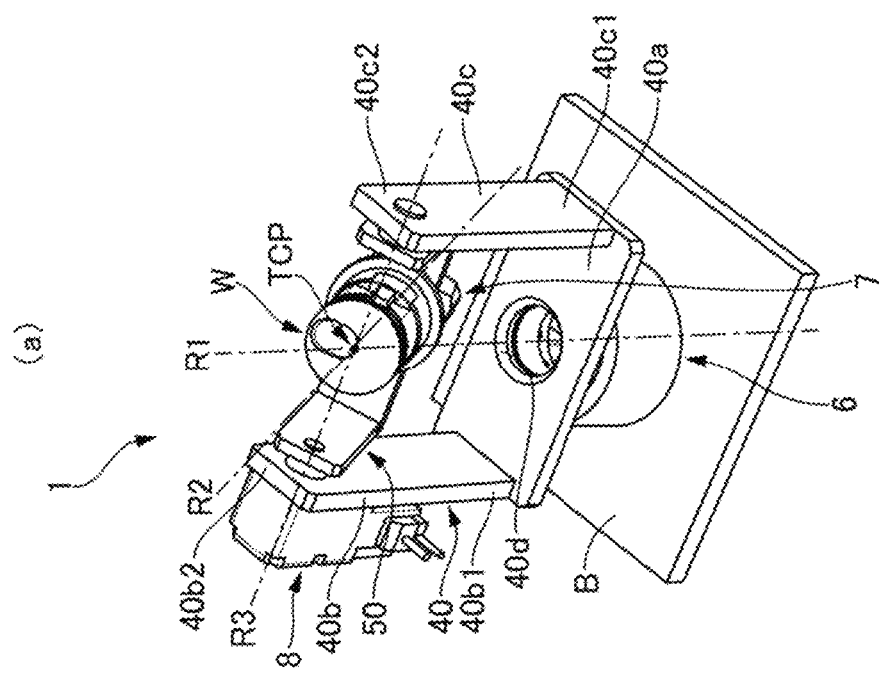
Figure 12:
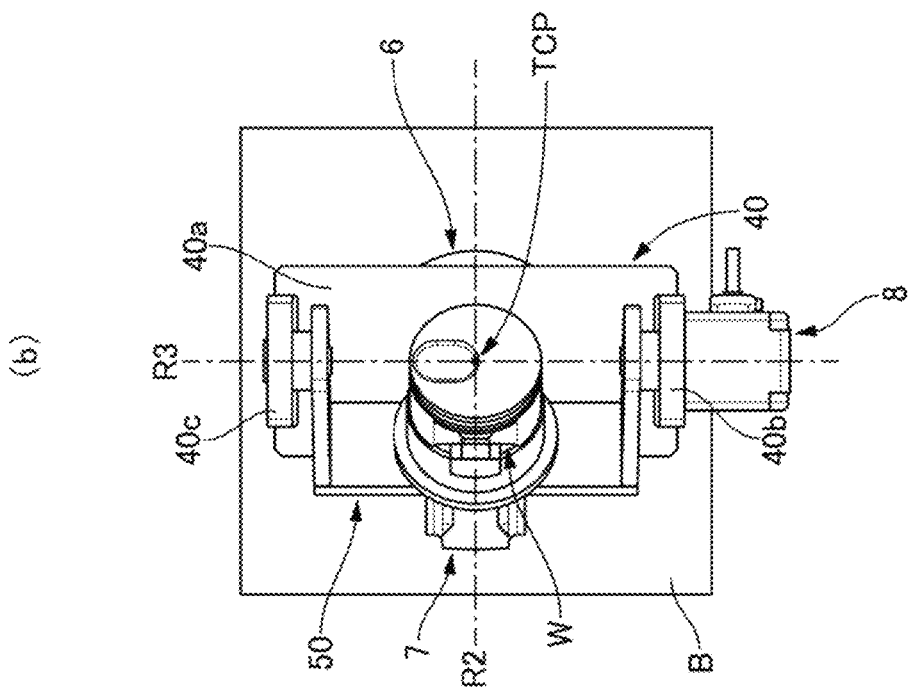
FIG. 12(a) is a second perspective view illustrating the operation of the pose change apparatus according to the second embodiment.
FIG. 12(b) is a second plan view illustrating the operation of the pose change apparatus according to the first embodiment.
Figure 12:
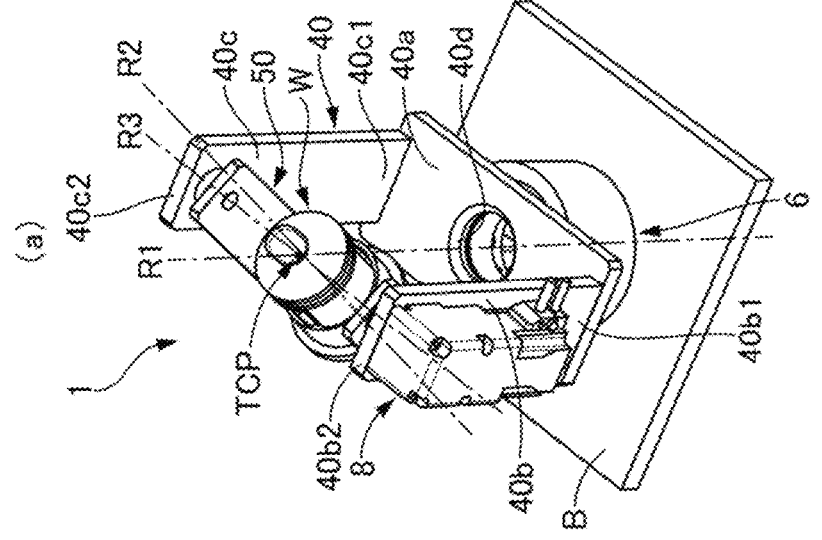
Figure 13:
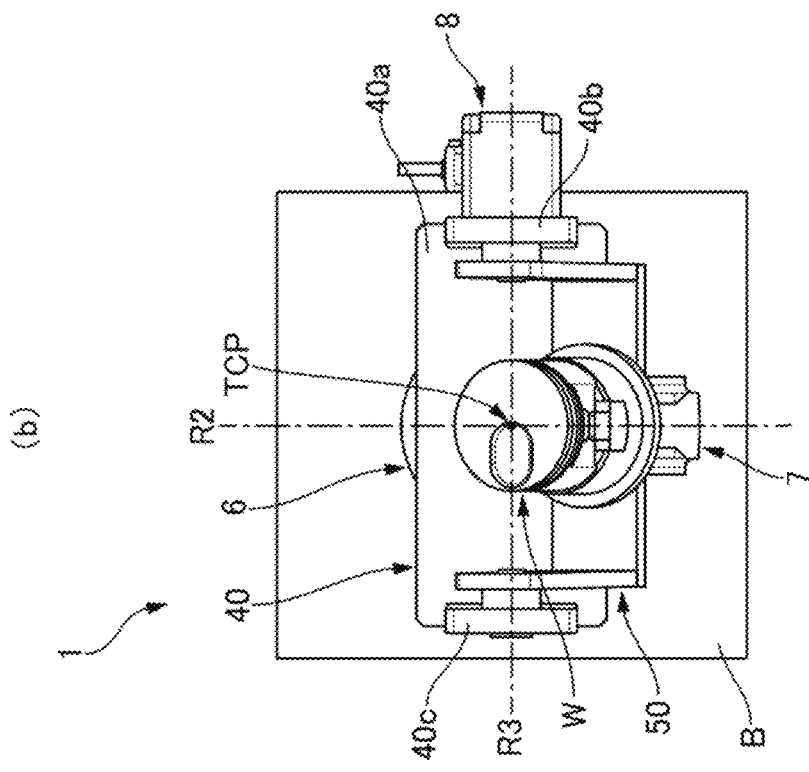
FIG. 13(a) is a third perspective view illustrating the operation of the pose change apparatus according to the second embodiment.
FIG. 13(b) is a third plan view illustrating the operation of the pose change apparatus according to the first embodiment.
Figure 13:
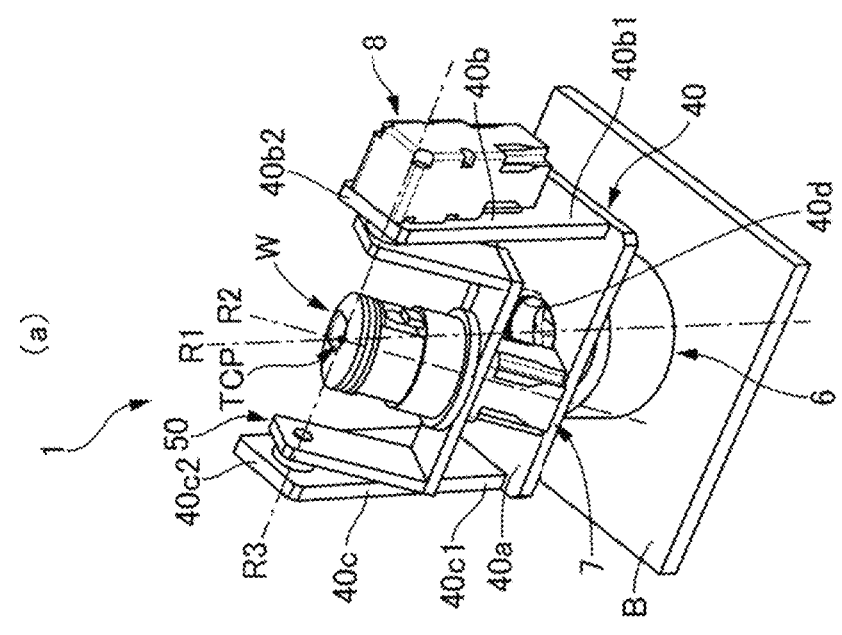
Figure 14:
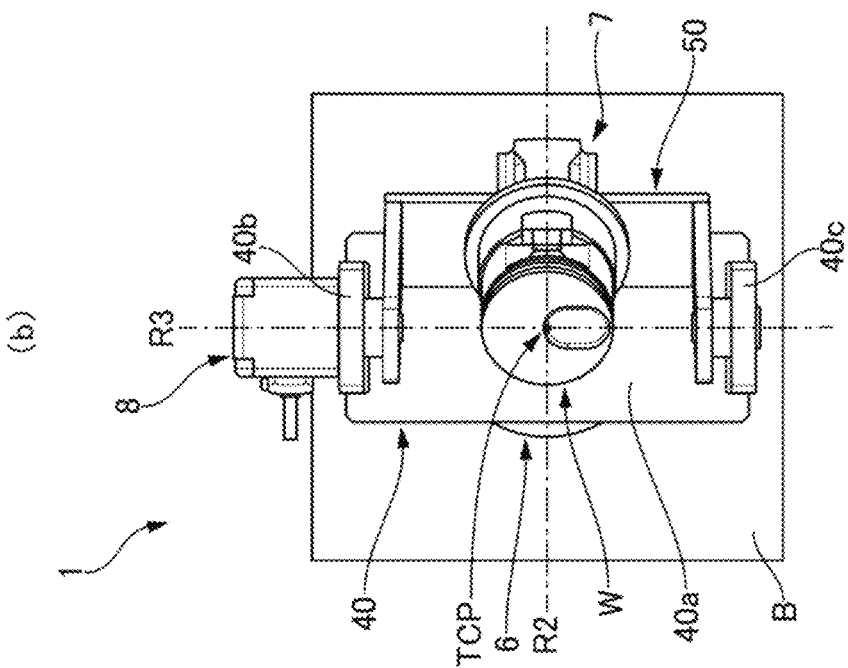
FIG. 14(a) is a fourth perspective view illustrating the operation of the pose change apparatus according to the second embodiment.
FIG. 14(b) is a fourth plan view illustrating the operation of the pose change apparatus according to the first embodiment.
Figure 14:
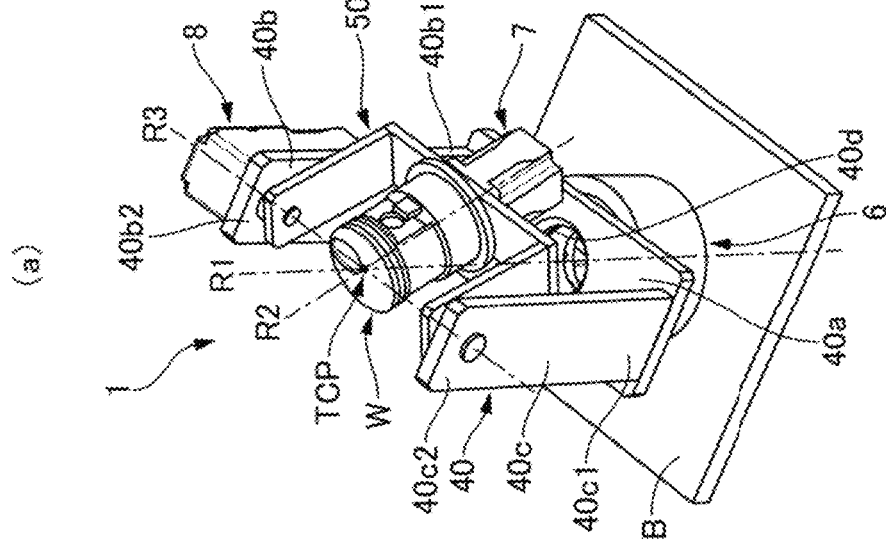
Figure 15:
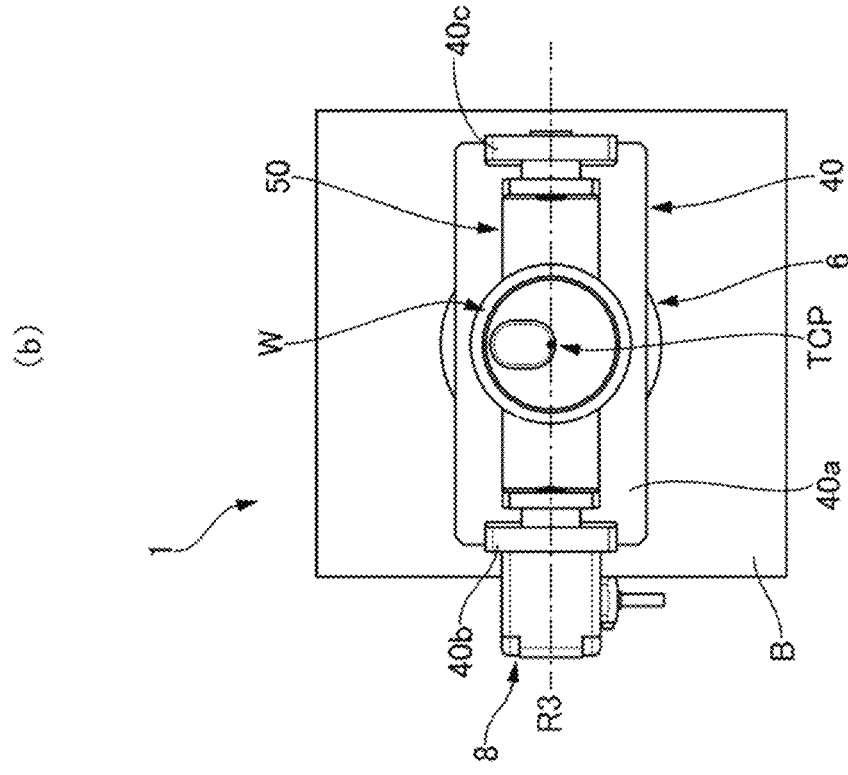
FIG. 15(a) is a fifth perspective view illustrating the operation of the pose change apparatus according to the second embodiment.
FIG. 15(b) is a fifth plan view illustrating the operation of the pose change apparatus according to the first embodiment.
Figure 15:
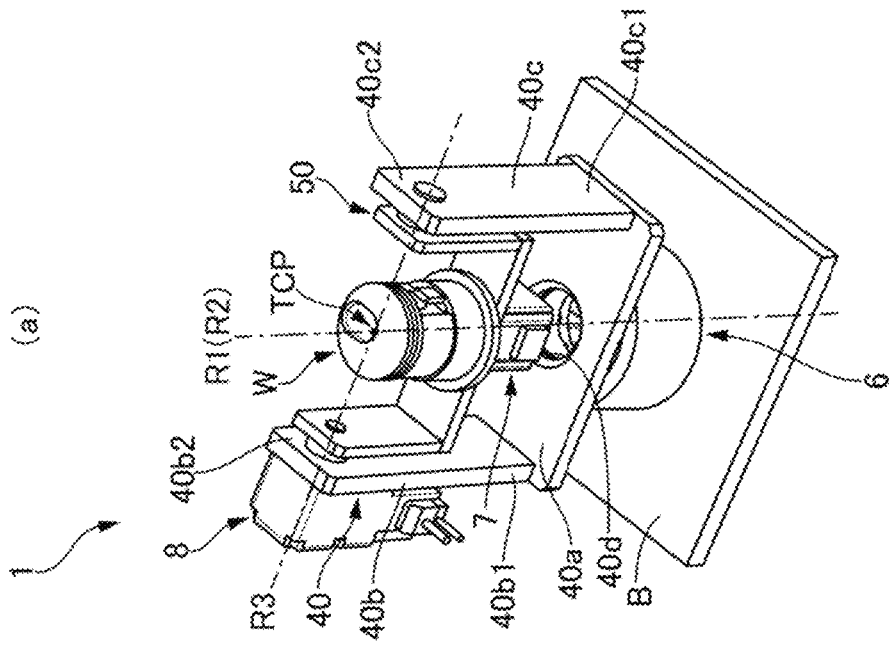

FIG. 10 is a timing chart illustrating a flow of an operation of the pose change apparatus according to the second embodiment. FIG. 11(*a*) is a first perspective view illustrating the operation of the pose change apparatus according to the second embodiment. FIG. 11(*b*) is a first plan view illustrating the operation of the pose change apparatus according to the second embodiment. FIG. 12(*a*) is a second perspective view illustrating the operation of the pose change apparatus according to the second embodiment. FIG. 12(*b*) is a second plan view illustrating the operation of the pose change apparatus according to the first embodiment. FIG. 13(*a*) is a third perspective view illustrating the operation of the pose change apparatus according to the second embodiment. FIG. 13(*b*) is a third plan view illustrating the operation of the pose change apparatus according to the first embodiment. FIG. 14(*a*) is a fourth perspective view illustrating the operation of the pose change apparatus according to the second embodiment. FIG. 14(*b*) is a fourth plan view illustrating the operation of the pose change apparatus according to the first embodiment. FIG. 15(*a*) is a fifth perspective view illustrating the operation of the pose change apparatus according to the second embodiment. FIG. 15(*b*) is a fifth plan view illustrating the operation of the pose change apparatus according to the first embodiment.

In a first step illustrated in FIG. 10, the piston W is placed on the second member 5 and fixedly held there with the first rotational axis R1 and the second rotational axis R2 located coaxially with each other, and the first member 4 and the second member 5 overlapping each other in the direction along the third rotational axis R3.

Next, the second member 5 is tilted to the specified angle θ0° and held there by the third motor output shaft 8_a_ of the third motor 8.

In other words, the second rotational axis R2 is tilted to the specified angle θ0° and held there with respect to the first rotational axis R1.

Then, the pose of the piston W is identified in the coordinate system of the piston W.

In a second step, the pose of the piston W in the coordinate system of the piston W that is acquired in the first step is converted into the coordinate system of the two-axis conical motion control mechanism based on the first rotational axis R1 and the second rotational axis R2, i.e., the coordinate system of the pose change apparatus 1.

Each of these steps is repeated for each of a plurality of teaching points, and the control rotational angles of the first output shaft 6_a_ of the first motor 6 and the second output shaft 7_a_ of the second motor 7 are determined.

In other words, the first motor output shaft 6_a_ of the first motor 6 is rotated by +0a° in a direction indicated by an arrow, and, at the same time, the second motor output shaft 7_a_ of the second motor 7 is rotated oppositely by –0a° in a direction indicated by an arrow with the rotational angle thereof synchronized with the first motor output shaft 6_a_ of the first motor 6.

Being synchronized means that the rotational angle (the number of rotations) of the first motor output shaft 6_a_ of the first motor 6 per unit time, and the rotational angle (the number of rotations) of the second motor output shaft 7_a_ of the second motor 7 per unit time are equal to each other.

This allows the piston W to perform a further correct conical motion.

This is repeated for each of the plurality of teaching points to rotate the first motor output shaft 6_a_ of the first motor 6 and the second motor output shaft 7_a_ of the second motor 7 by 360° in respective opposite directions with the rotational angles thereof synchronized with each other, thereby determining the control rotational angles of the first motor output shaft 6_a_ of the first motor 6 and the second motor output shaft 7_a_ of the second motor 7.

In a third step, the image of the inspection surface of the piston W is captured by the camera D at each of the plurality of teaching points similarly to the first embodiment, although this is not illustrated.

Further, after the end of the image capturing, the first motor output shaft 6_a_ of the first motor 6 is rotated reversely to be returned to the operation position of step 2, and is subsequently returned to the operation position of step 1 where the second member 5 and the first member 4 overlap each other in the direction along the third rotational axis R3 by the third motor output shaft 8_a_ of the third motor 8.

This allows the piston W to perform the conical motion by 360° around the second rotational axis R2 about the piston conical motion center TCP with a simple configuration capable of curbing a cost increase similarly to the first embodiment.

FIG. 11 illustrate the operation position of step 2 in FIG. 10. FIG. 15 illustrate the operation position of step 1 in FIG. 10 after the end of the image capturing. FIGS. 12 to 14 illustrate operation positions while the first motor output shaft 6_a_ of the first motor 6 and the second motor output shaft 7_a_ of the second motor 7 are being rotated in the respective opposite directions with their rotational angles synchronized with each other.

Other than that, the second embodiment is configured similarly to the first embodiment, and therefore will be described assigning the same reference numerals to similar components and omitting the descriptions thereof.

(1) The pose change apparatus 1 is configured to include the first motor 6, the base portion 40_a_, the second member 50, the second motor 7, and the third motor 8. The first motor 6 includes the first motor output shaft 6_a_ fixed to the base B and rotatable around the first rotational axis R1. The second member 50 is swingably supported by the opposite end 40_b_2 of the first arm 40_b_ and the opposite end 40_c_2 of the second arm 40_c_ extending in a forked manner in the direction along the first rotational axis R1 with the one ends 40_b_1 and 40_c_l fixed to the base portion 4_a_ while spaced apart from each other, and fixedly holds the piston W with both the radial sides thereof opened. The second motor 7 includes the second motor output shaft 7_a_ fixed to the second member 50 and rotatable around the second rotational axis R2 tiltable at an angle with respect to the first rotational axis R1. The third motor 8 includes the third motor output shaft 8_a_ fixed to the opposite end 40_b_2 of the first arm 40_b_ of the first member 40 and rotatable around the third rotational axis R3 approximately perpendicular to and intersecting with the first rotational axis P1.

Therefore, the conical motion of the piston W can be achieved with a simple configuration capable of curbing a cost increase.

(2) The pose change apparatus 1 is configured in such a manner that the first motor output shaft 6_a_ of the first motor 6 is rotated by +θa° in the direction indicated by the arrow, and, at the same time, the second motor output shaft 7_a_ of the second motor 7 is rotated oppositely by –θa° in the direction indicated by the arrow with the rotational angle thereof synchronized with the first motor output shaft 6_a_ of the first motor 6.

This allows the piston W to perform a further correct conical motion.

(3) The pose change apparatus 1 is configured in such a manner that the third motor output shaft 8_a_ fixed to the opposite end 40_b_2 of the first arm 40_b_ of the first member 40 can change the tilt angle of the second rotational axis R2 with respect to the first rotational axis R1, and cause the second member 50 to swing around the third rotational axis R3 to change the tilt angle of the second member 50 with respect to the first member 40, i.e., the tilt angle of the second rotational axis R2 with respect to the first rotational axis R1 to a predetermined angle and hold it there.

Therefore, the pose change apparatus 1 can maintain an arbitrary required predetermined swing angle and achieve a further correct conical motion, and, along therewith, also allow the piston W to be easily replaced by returning the second member 50 to the position where it overlaps the first member 40.

(4) The pose change apparatus 1 is configured in such a manner that the power supply harness 7_b_ of the second motor 7 is inserted through the through-hole 40_d_ formed on the base portion 40_a_ of the first member 40 and the first motor output shaft 6_a_.

This makes the power supply harness 7_b_ less obstructive even when the second motor output shaft 7_a_ of the second motor 7 is rotated.

(5) The pose change apparatus 1 is configured to include the second member 50 between the first arm 40_b_ and the second arm 40c extending in the direction along the first rotational axis R1 in a forked manner.

Therefore, an increase in the size of the pose change apparatus 1 can be prevented.

(6) The pose change apparatus 1 is configured in such a manner that the second member 50 is opened on both the radial sides.

Therefore, the piston W can be easily set up and extracted.

Figure 16:
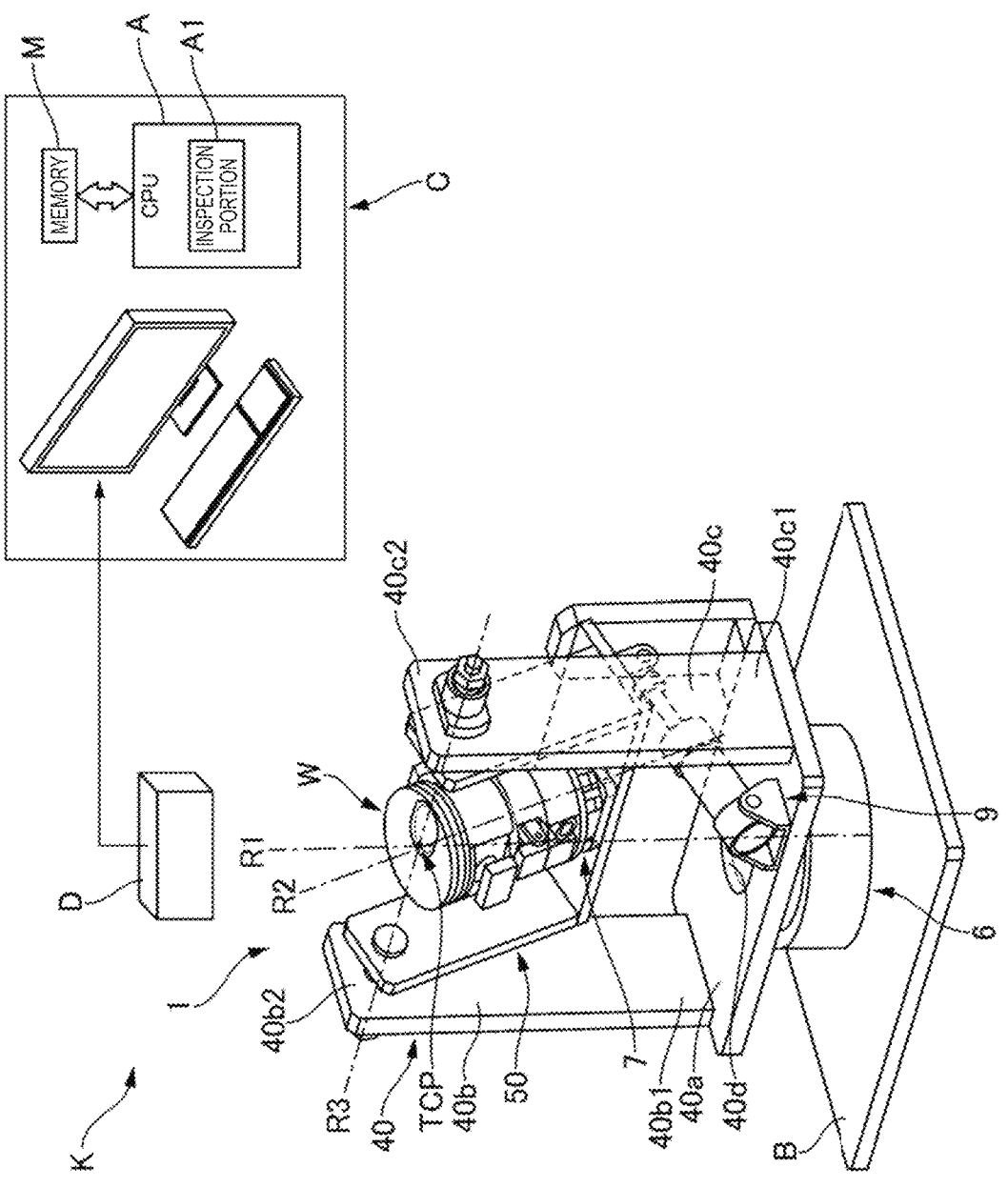
FIG. 16 is a perspective view of a pose change apparatus according to a third embodiment.

FIG. 16 is an overall view of an inspection apparatus including a pose change apparatus according to a third embodiment.

The second embodiment is configured in such a manner that the second rotational axis R2, i.e., the second member 50 is tilted around the first rotational axis R1 by the specified angle θ0 with respect to the first member 40 and is held there using the third motor 8, but the third embodiment is configured in such a manner that the second member 50 is tilted around the first rotational axis R1 by the specified angle θ0 with respect to the first member 40 and is held there using an air cylinder (the angle holding mechanism) 9.

Other than that, the third embodiment is configured similarly to the second embodiment, and therefore will be described assigning the same reference numerals to similar components and omitting the descriptions thereof.

Therefore, the third embodiment can also fulfill similar functions and bring about similar advantageous effects to the second embodiment.

Other Embodiments

Having described the embodiments for implementing the present invention, the specific configuration of the present invention is not limited to the configurations of the embodiments, and the present invention also includes even a design modification and the like thereof made within a range that does not depart from the spirit of the present invention, if any.

The inspection target is not limited to the piston, and the learning result may be any machine learning without being limited to a neural network inspection target and deep learning.

Further, the first motor output shafts 2a and 6a, and the second motor output shafts 3a and 7a are assumed to correspond to the first output shaft and the second output shaft, respectively, as the embodiments, but each motor output shaft may be coupled with each member via a flexible shaft and the flexible shaft may be assumed to correspond to the output shaft.

Further, the second and third embodiments are configured in such a manner that the second member 50 is tilted to the specified angle θ0 with respect to the first rotational axis R1 and is held there using the third motor 8 or the air cylinder 9, but a bolt (a fixation member) capable of fastening and unfastening the first member 40 and the second member 50 may be used as the angle holding mechanism although not illustrated.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2022-002043 filed on Jan. 11, 2022. The entire disclosure of Japanese Patent Application No. 2022-002043 filed on Jan. 11, 2022 including the specification, the claims, the drawings, and the abstract is incorporated herein by reference in its entirety.

REFERENCE SIGNS LIST

1 pose change apparatus
    2 first motor (first actuator)
    2a first motor output shaft (first output shaft)
    3 second motor (second actuator)
    3a second motor output shaft (second output shaft)
    4 first member
    4a base portion
    4b first arm
    40 first member
    40 base portion
    40L first arm
    40 second arm
    40d through-hole
    5 second member
    50 second member
    6 first motor (first actuator)
    6a first motor output shaft (first output shaft)
    7 second motor (second actuator)
    7a second motor output shaft (second output shaft)
    7b power supply harness
    8 third motor (angle holding mechanism)
    9 air cylinder (angle holding mechanism)
    P1 first rotational axis
    P2 second rotational axis
    R1 first rotational axis
    R2 second rotational axis
    W piston (inspection target)

The invention claimed is:

1. A pose change apparatus capable of changing a pose of an inspection target with the inspection target kept in a held state, the pose change apparatus comprising:

a first output shaft rotatable around a first rotational axis;

a first member rotatable around the first output shaft according to a rotation of the first output shaft;

a second output shaft disposed on the first member and rotatable around a second rotational axis tilted at an angle with respect to the first rotational axis;

a second member disposed on the first member and configured to hold the inspection target, the second member being rotatable around the second rotational axis according to a rotation of the second output shaft;

a first actuator configured to rotate the first output shaft forwardly and reversely within a first angular range; and a second actuator configured to rotate the second output shaft forwardly and reversely within a second angular range, wherein the first actuator and the second actuator are configured to be synchronously driven so as to cause the inspection target to perform a conical motion about a point at which the first rotational axis and the second rotational axis intersect with each other.

2. The pose change apparatus according to claim 1, wherein:

the first member includes a base portion coupled with the first output shaft and a first arm extending from the base portion in a direction along the first rotational axis; and the second member is rotatably disposed on the first arm.

3. The pose change apparatus according to claim 2, wherein the second rotational axis is approximately perpendicular to the first rotational axis.

4. The pose change apparatus according to claim 2, wherein:

the first actuator is a first motor; and the second actuator is a second motor fixed to the first arm.

5. The pose change apparatus according to claim 1, wherein a maximum output of the second motor is lower than a maximum output of the first motor.

6. An inspection method using the pose change apparatus according to claim 1, the inspection method comprising:

a first step of identifying a pose of the inspection target in a coordinate system of the inspection target;

a second step of converting the pose of the inspection target in the coordinate system of the inspection target that is acquired in the first step into a pose of the inspection target in a coordinate system of the pose change apparatus; and a third step of actuating the pose change apparatus according to the pose of the inspection target in the coordinate system of the pose change apparatus that is acquired in the second step and imaging the inspection target, wherein the first actuator and the second actuator are synchronously driven so as to cause the inspection target to perform the conical motion about the point at which the first rotational axis and the second rotational axis intersect with each other.

7. A pose change apparatus capable of changing a pose of an inspection target with the inspection target kept in a held state, the pose change apparatus comprising:

a first output shaft rotatable around a first rotational axis;

a first member rotatable around the first output shaft according to a rotation of the first output shaft;

a second member disposed on the first member and operable to tilt the inspection target in a direction along a second rotational axis tilted at an angle with respect to the first rotational axis;

a second output shaft disposed on the second member and operable to rotate the inspection target around the second rotational axis;

a first actuator configured to rotate the first output shaft; and a second actuator configured to rotate the second output shaft around the second rotational axis in an opposite direction from a direction in which the first member is rotated when the first output shaft is rotated around the first rotational axis, wherein the first actuator and the second actuator are configured to be synchronously driven so as to cause the inspection target to perform a conical motion about a point at which the first rotational axis and the second rotational axis intersect with each other.

8. The pose change apparatus according to claim 7, wherein a number of rotations of the first output shaft per unit time and a number of rotations of the second output shaft per unit time are equal to each other.

9. The pose change apparatus according to claim 7, wherein the second member is swingable with respect to the first member, and operable to change a tilt angle of the second rotational axis with respect to the first rotational axis.

10. The pose change apparatus according to claim 9, wherein the second member includes an angle holding mechanism configured to maintain an angle by which the second member is swingable with respect to the first member.

11. The pose change apparatus according to claim 10, wherein the angle holding mechanism is a motor.

12. The pose change apparatus according to claim 10, wherein the angle holding mechanism is an air cylinder.

13. The pose change apparatus according to claim 10, wherein the angle holding mechanism is a fixation member operable to fasten and unfasten the first member and the second member.

14. The pose change apparatus according to claim 7, wherein:

the first actuator is a first motor; and the second actuator is a second motor disposed on the second member.

15. The pose change apparatus according to claim 14, further comprising a through-hole extending through the first member and the first output shaft, wherein the second motor includes a power supply harness which extends through the through-hole.

16. The pose change apparatus according to claim 7, wherein:

the first member includes a base portion coupled with the first output shaft, and a first arm and a second arm forkedly extending from the base portion in a direction along the first rotational axis; and the second member is rotatably disposed on the first arm and the second arm.

17. The pose change apparatus according to claim 16, wherein the second member is open on both radial sides thereof.

18. An inspection method using the pose change apparatus according to claim 7, the inspection method comprising:

a first step of identifying a pose of the inspection target in a coordinate system of the inspection target;

a second step of converting the pose of the inspection target in the coordinate system of the inspection target that is acquired in the first step into a pose of the inspection target in a coordinate system of the pose change apparatus; and a third step of actuating the pose change apparatus according to the pose of the inspection target in the coordinate system of the pose change apparatus that is acquired in the second step and imaging the inspection target, wherein the first actuator and the second actuator are synchronously driven so as to cause the inspection target to perform the conical motion about the point at which the first rotational axis and the second rotational axis intersect with each other.

* * * * *